United States Patent [19]

Batzill et al.

[11] 4,436,878
[45] Mar. 13, 1984

[54] WATER-DISPERSIBLE BINDERS FOR CTIONIC ELECTROPAINTS, AND A PROCESS FOR THEIR PREPARATION

[75] Inventors: Wolfgang Batzill, Münster; Horst Diefenbach, Nottuln; Michael Geist, Müster; Eberhard Schupp, Schwetzingen, all of Fed. Rep. of Germany

[73] Assignee: BASF Farben & Fasern AG, Hamburg, Fed. Rep. of Germany

[21] Appl. No.: 471,739

[22] Filed: Mar. 3, 1983

[30] Foreign Application Priority Data

Mar. 20, 1982 [DE] Fed. Rep. of Germany ....... 3210306

[51] Int. Cl.$^3$ ............................................. C08L 63/00
[52] U.S. Cl. ................................. 525/438; 204/181 C; 525/423; 525/454; 525/528; 525/530
[58] Field of Search ............... 525/530, 528, 438, 423, 525/454

[56] References Cited

U.S. PATENT DOCUMENTS 2,851,440 9/1958 D'Alelio .............................. 525/530
4,393,173 7/1983 Daniels ................................ 525/530

FOREIGN PATENT DOCUMENTS 59895 2/1982 European Pat. Off. .

Primary Examiner—Paul Lieberman
Attorney, Agent, or Firm—Wells & Wells

[57] ABSTRACT

The invention relates to water-dispersible binders which are intended for cationic electropaints and are based on reaction products which are formed from modified epoxy resins and primary and/or secondary amines and which can, if desired, also contain crosslinking agents, pigments, flow-control agents and other customary auxiliaries. The reaction products have been prepared by reacting (A) Low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the general formula

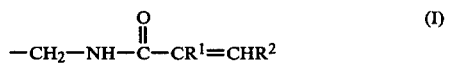

in which R$^1$ and R$^2$ are identical to or different from one another and represent hydrogen or a methyl group, and by adding a primary and/or secondary amine before or after the reaction of the phenolic hydroxyl groups with the epoxy groups, to at least some of the double bonds of the grouping of the formula (I).

36 Claims, No Drawings

WATER-DISPERSIBLE BINDERS FOR CATIONIC ELECTROPAINTS, AND A PROCESS FOR THEIR PREPARATION

The invention relates to water-dispersible binders which are intended for cationic electropaints and are based on reaction products which are formed from modified expoxy resins with primary and/or secondary amines and which can, if desired, also contain crosslinking agents, pigments, flow-control agents and other customary auxiliaries.

Cationic water-dispersible synthetic resins are known for use as binders for electropaints. For instance, German Offenlegungsschrift No. 2,701,002 describes such as resin which is a reaction product of a polyepoxide which has a molecular weight of at least 350, a secondary amine and an organic polyol having at least two alcoholic primary hydroxyl groups. The resins are formed by chain-lengthening high molecular weight polyepoxides which have at least 2 epoxy groups per molecule. The chain-lengthening is achieved by means of an organic polyol, and the water-dispersibility is obtained by adduct formation with a secondary amine.

This and other known synthetic resin for cathodic electrocoating are frequently used as primers, ie. articles coated with them receive an additional, top coat of paint. However, it is a disadvantage that only relatively thin coatings can be obtained with existing resins. For instance German Offenlegungsschrift No. 2,701,002 mentions achievable layers which are only 11.4–18 μm thick. If a coating is subjected to particularly high requirements in respect of corrosion resistance and surface quality, as is the case, for example, with coatings on automotive vehicles and other high-value goods, it has therefore hitherto been customary to apply an additional layer between the electroprimer and the top coat, namely a so-called filler. This is involved and expensive. It is therefore desirable to improve the electrocoating method in such a way that thicker layers can be obtained with this process. As already mentioned above, this is however impossible with existing cationic synthetic resins. The problems arise due to the fact that increasing the deposition voltage to above the breakdown voltage causes surface defects in the film due to the fact that the layer cracks open. Extending the coating time also produces an increase in the film thickness, but this increase cannot be continued for as long as desired, since the electrical resistance of the deposited film normally defines an upper limit to the film thickness at which there is virtually no further increase in film thickness however long the coating period.

According to the main patent . . . (Patent Application No. P 31 08 073.1-44) it is now possible to obtain relatively thick films in electrocoating when binders are used which are based on modified epoxy resins and which contain aromatic and aliphatic or alicyclic groups in certain ratios.

The present invention then relates to water-dispersible binders of the type mentioned in the introduction which give thick films on electrocoating and lead to surface coatings which, compared to the main patent, have improved properties. It has been found that it is advantageous to add the amine used for solubilizing to the binder molecule via a monophenol or diphenol substituted by an α,β-olefinically unsaturated amidomethyl grouping.

The invention therefore relates to binders of the type mentioned in the introduction which contain reaction products which have been obtained by reacting (A) low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as the phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate products has a terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the general formula

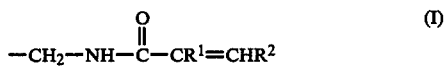

in which $R^1$ and $R^2$ are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

The addition of the amine to some of the double bonds of the grouping of the formula (I) means that the remaining double bonds are available for crosslinking reactions when the surface coatings prepared by means of the binders according to the invention are being baked. This additional crosslinking results in improved surface quality and increased hydrolysis resistance of the resulting coatings to chemical or atmospheric attack. A further result is increased bath stability of aqueous coating baths prepared with binders according to the invention.

Suitable for use as component A—low molecular weight epoxy resins which contain aromatic groups and have an epoxide equivalent weight of less than 375—are polyepoxides. For the purposes of the present invention polyepoxides are materials which contain two or more epoxy groups in the molecule. Preferred compounds have two epoxy groups in the molecule. The polyepoxides have a a relatively low molecular weight of at most 750, preferably 400–500. The polyepoxides can be, for example, polyglycidyl ethers of polyphenols, such as bisphenols, advantageously, for example, bisphenol A. These polyepoxides can be prepared by etherifying a polyphenol with an epihalohydrin in the presence of alkali. Examples of suitable phenol compounds are bis-(4-hydroxyphenyl)-2,2-propane, 4,4'-dihydroxybenzophenone, bis-(4-hydroxyphenyl)-1,1-ethane, bis-(4-hydroxyphenyl)-1,1-isobutane, bis-(4-hydroxy-tertiary-butylphenyl)-2,2-propane, bis-(2-hydroxynaphthyl)-methane, 1,5-dihydroxynaphthalene and hydantoin epoxides.

Another suitable class of polyepoxides are polyglycidyl ethers of phenolic novolak resins.

It is also advantageous to use polyglycidyl esters of aromatic polycarboxylic acids.

The compounds used as component B are aliphatic and/or alicyclic polyfunctional alcohols or carboxylic acids having a molecular weight of less than 350. These advantageously have a branched aliphatic chain, in particularly with at least one neo structure.

Suitable compounds have the following general formula:

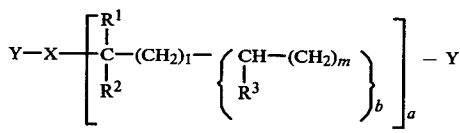

where Y=OH or COOH, X=$(CH_2)_n$

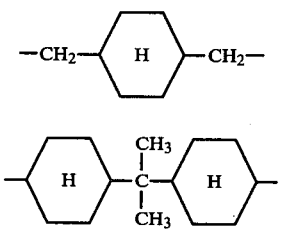

$R^1$, $R^2$ and $R^3$=H or an alkyl radical having 1 to 5 carbon atoms, a=0 or 1, b=0 or 1, l=0–10 and m,n=1–10.

Specific examples are diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, but-2-ene-1,4-diol, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl 2,2-dimethylhydroxypropionate, 2-methyl-2-propyl-3-hydroxypropyl 2-methyl-2propylhydroxypropionate, 4,4′-methylenebiscyclohexanol and 4,4′-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4′-isopropylidenebicyclohexanol.

There are a large number of dicarboxylic acids suitable for use as carboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid, mesaconic acid or glutaconic acid.

Examples of dicarboxylic acids which are preferably used are 2,2-dimethylmalonic acid and hexahydrophthalic acid.

The essential point is that the compounds of component B are reacted with component A in such a ratio that the reaction product has the specified aromatic group content, calculated as the phenylene group, namely of 10–45%.

If desired component C is concomitantly used in preparing the reaction product. Component C's share of the total binder is advantageously 10–50 percent by weight.

The polyfunctional alcohols, carboxylic acids and SH compounds suitable for use as component C have a molecular weight of 300–5,000, preferably 530–3,000. Polyols suitable for the purposes of the invention embrace diols, triols and higher polymeric polyols, such as polyester-polyols or polyether polyols. Polyesterpolyols, and of them polycaprolactone polyols, are particularly preferable.

Polyalkylene ether polyols suitable for use as component C are of the following formula:

in which R=hydrogen or a lower alkyl radical which is unsubstituted or substituted by different substituents, n=2 to 6 and m=10 to 50 or more. Examples are poly(oxytetramethylene) glycols and poly(oxyethylene) glycols.

The preferred polyalkylene ether polyols are poly(oxytetramethylene) glycols having a molecular weight within the range from 500 to 3,000.

The polyester-polyols can also be used for the purposes of the invention as polymeric polyol component (component C). The polyester-polyols can be prepared by polyesterifying organic polycarboxylic acids or their anhydrides with organic polyols. The polycarboxylic acids and the polyols are customarily aliphatic or aromatic dicarboxylic acids and diols.

The diols used to prepare the polyesters include alkylene glycols, such as ethylene glycol or butylene glycol, neopentylglycol and other glycols, such as cyclohexanedimethanol.

The acid component of the polyester consistings primarily of low molecular weight carboxylic acids or their anhydrides which have 2 to 18 carbon atoms in the molecule.

Examples of suitable acids are phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. These acids can also be replaced by their anhydrides insofar as these exist.

It is also possible, for the purpuses of the invention, to use polyester-polyols which are derived from lactones as component C. These products are obtained, for example, by reacting an ε-caprolactone with a polyol. U.S. Pat. No. 3,169,945 describes such products.

The polylactonepolyols which are obtained by this reaction are distinguished by the presence of a terminal hydroxyl group and by recurring polyester fractions which are derived from the lactone. These recurring molecular fractions can be of the formula

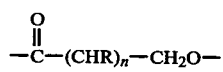

in which n is at least 4, preferably 4 to 6, and the substituent is hydrogen, an alkyl radical, a cycloalkyl radical or an alkoxy radical and does not contain more than 12 carbon atoms, and the total number of carbon atoms in the substituent in the lactone ring does not exceed 12.

The lactone used as starting material can be any desired lactone or any desired combination of lactones, but this lactone should contain at least 6 carbon atoms in the ring, for example 6 to 8 carbon atoms, and at least 2 hydrogen substituents should be present on the carbon atom which is bonded to the oxygen group of the ring. The lactone used as a starting material can be represented by the following general formula:

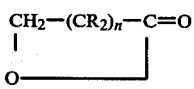

in which n and R have the abovementioned meaning.

According to the invention, the lactones preferred for preparing the polyester-polyols are ε-caprolactones, where n has a value of 4. The most preferred lactone is unsubstituted ε-caprolacetone, where n has a value of 4 and all R substituents are hydrogen. This lactone is particularly preferable, since it is available in substantial quantities and gives coatings having excellent properties. It is also possible to use various other lactones either on their own or combined.

Examples of suitable aliphatic diols include ethylene glycol, 1,3-propanediol, 1,4-butanediol and 1,4-cyclohexanedimethanol. An example of a suitable aliphatic triol is trimethylolpropane. The preferred polycaprolactonepolyols have molecular weights within the range from 530 to 3,000.

Polyurethanes are another class of resins or polymers which can be used as component C. As is known, the polyurethanes are polyadducts of polyisocyanates and a compound having at least two reactive hydrogen atoms, ie. hydrogen atoms which can be detected by the Zerevitinov method.

Examples of suitable compounds having active hydrogen atoms are polyesters of polycarboxylic acids and polyhydric alcohols, polyhydric polyalkylene ethers having at least two hydroxyl groups, polythioether glycols, and polyester-amides.

The polyesters or polyester-amides used to prepare the polyurethanes can be branched and/or linear, for example esters of adipic acid, sebacic acid, 6-aminocaproic acid, phthalic acid, isophthalic acid, terephthalic acid, oxalic acid, malonic acid, succinic acid, maleic acid, cyclohexane-1,2-dicarboxylic acid, cyclohexane-1,4-dicarboxylic acid, polyacrylic acid, naphthalene-1,2-dicarboxylic acid, fumaric acid or itaconic acid, with polyalcohols, such as ethylene glycol, diethylene glycol, pentaglycol, glycerols, sorbitol, triethanolamine, di-(β-hydroxyethyl) ether and/or amino-alcohols, such as ethanolamine, 3-aminopropanol, 5-aminopentan-1-ol, 10-aminodecanol, 6-amino-5-methylhexan-1-ol, p-hydroxymethylbenzylamine or with mixtures of these polyalcohols and amines, such as ethylenediamine, 3-methylhexamethylenediamine, decamethylenediamine and m-phenylenediamine and/or amino-alcohols. In the esterification or amide formation reaction the acid can be used as such or can be replaced by an equivalent compound, such as the acid halide or acid anhydride.

Examples of compounds which can be used as alkylene glycol or polyoxyalkylene glycol or polythioalkylene glycol in the preparation of the polyurethanes are ethylene glycol, propylene glycol, butylene glycol, 2-methylpentane-2,4-diol, 2-ethylhexane-1,3-diol, hexamethylene glycol, styrene glycol, diethylene glycol, tetraethylene glycol, polythioethylene glycol, polyethylene glycol 200, 400, 600 and higher, dipropylene glycol, tripropylene glycol, trithiopropylene glycol and polypropylene glycol 400, 750, 1,200, 2,000 and higher.

It is accordingly possible to prepare the polyurethanes with any desired polyester, polyisocyanate-modified polyesters, polyester-amides, polyisocyanate-modified polyester-amides, alkylene glycols, polyisocyanate-modified alkylene glycols, polyoxyalkylene glycols and polyisocyanate-modified polyoxyalkylene glycols which have free reactive hydrogen atoms, free reactive carboxyl groups and/or in particular hydroxyl groups. It is in particular possible to use any organic compound which has at least two radicals from the class consisting of the hydroxyl and the carboxyl group.

Examples of suitable organic polyisocyanates for preparing the polyurethanes are ethylene diisocyanate, propylene 1,2-diisocyanate, cyclohexylene diisocyanate, m-phenylene diisocyanate, 2,4-toluene diisocyanate, 3,3'-dimethoxy-4,4-biphenylene diisocyanate, 3,3'-dichloro-4,4'-biphenylene diisocyanate, triphenylmethane triisocyanate, 1,5-naphthalene diisocyanate, hydrogenated toluylene diisocyanate, methylene bis(cyclohexylisocyanate), isophorone diisocyanate, trimethylhexamethylene diisocyanate, methyl lysinediisocyanate and polyisocyanates in the blocked or inactive form, such as bisphenyl carbonates of toluylene diisocyanate and 1,5-naphthalene diisocyanate.

Suitable polyfunctional SH compounds (component C) are reaction products of organic dihalides with sodium polysulfide. Examples of further SH compounds are reaction products of hydroxyl-containing linear polyesters, polyethers or polyurethanes with mercaptocarboxylic acids, such as mercaptoacetic acid, 2-mercaptopropionic acid, 3-mercaptopropionic acid, mercaptobutyric acid and the like.

The intermediate product obtained from components (A), (B) and, if desired, (C) has terminal epoxy groups. In preparing the binders according to the invention these epoxy groups then were subject to an addition reaction by monophenol or diphenol, via its phenolic hydroxyl group, which carries as substituents on the aromatic ring at least one α,β-olefinically unsaturated amidomethyl group of the general formula

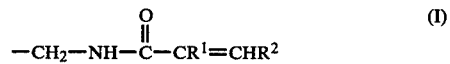

$R^1$ and $R^2$ can be identical to or different from one another, and represent hydrogen or a methyl group.

Those groups of the formula (I) are preferable where $R^1$ denotes hydrogen or a methyl group and $R^2$ denotes hydrogen. The monophenols and/or polyphenols carrying the α,β-unsaturated amidomethyl groups can be prepared from phenols or polyphenols respectively and compounds of the formula

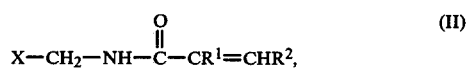

in which X represents OH, halogen, such as, for example, chlorine, or an alkoxy group having 1 to 8, preferably 1 to 4, carbon atoms and $R^1$ and $R^2$ have the abovementioned meaning.

Suitable phenols are monophenols and/or polyphenols, especially monophenols such as phenol, and monoalkylphenol having up to 20 carbon atoms in the alkyl chain. It is also possible to use diphenols of the general formula

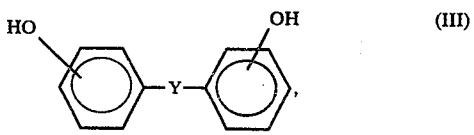

in which the OH groups are in the ortho- and/or para-position relative to Y, and Y represents a straight-chain or branched divalent aliphatic radical having 1 to 3 carbon atoms or represents —SO$_2$—, —SO—, —S—, —CO— or —O—. A suitable diphenol is 2,2-bis-p-hydroxyphenylpropane (bisphenol A).

Examples of suitable monophenols are phenol, cresols, o- or p-tert.-butylphenol, Cardanol, and the like. Cardanol is a natural product and consists of a mixture a long-chain 2-alkylenephenols having about 13 to 17 carbon atoms in the alkylene moiety, for example 3-(8,11-pentadecadienyl)-phenol. These alkylene chains lead on using Cardanol, to binders with which particularly resilient coatings can be prepared.

The phenols can be reacted with the compounds of the formula (II) within a wide temperature range, advantageously in the presence of solvents, such as toluene, xylene, isobutanol, ethylglycol, ethylhexanol or the like.

If strong acids, such as HCl, are used as catalysts it is possible to carry out the reaction at temperatures around 0° C., while weaker acidic catalysts may require temperatures of up to about 160° C. It is also possible to prepare compounds of the formula (II) in situ and then to react them with the phenol concerned.

The reaction of phenols with compounds of the formula (II) involves elimination of HX and an amidomethylation at the aromatic nucleus of the phenol. Such reactions are known as Tscherniac-Einhorn reactions. U.S. Pat. No. 3,839,447 describes the reaction of 2,2-bis-p-hydroxyphenylpropane with N-methylolacrylamide in glacial acetic acid using HCl as catalyst. The resulting diphenols which carry $\alpha,\beta$-olefinically unsaturated amidomethyl groups can be used to prepare the polyaddition products according to the invention. By using, for example, N-methylol fatty acid amides it is possible in a simple manner to add to the phenols groups which act in a flexibility-imparting manner.

It is possible to use 1 to 3 moles of compound of the formula (II) per equivalent of phenol (=phenolic OH group). However, in general 1.5 to 2.5 moles per equivalent of phenol are adequate to ensure optimal crosslinking density in the finished paint film.

The amine used for the further reaction with some of the double bonds can be primary or secondary, but secondary amines are particularly highly suitable. The amine should preferably be a compound which is soluble in water. Examples of such amines are monoalkylamines and dialkylamines, such as methylamine, ethylamine, propylamine, butylamine, dimethylamine, diethylamine, dipropylamine, methylbutylamine and the like. Alkanolamines are also suitable, such as, for example, methylethanolamine, diethanolamine and the like. Furthermore, dialkylaminoalkylamines are suitable, such as, for example, dimethylaminoethylamine, diethylaminopropylamine and the like.

In most cases low molecular weight amines are used, but it is also possible to use monoamines which have a relatively high molecular weight, in particular when it is intended to increase the flexibility of the resin by incorporating such amines. Similarly it is also possible to use mixtures of low molecular weight and high molecular weight amines to modify resin properties.

The amines can also contain other groups, but these should not interfere with the addition of the amine to the double bonds, nor should they cause gelling of the reaction mixture.

The addition of the amine to the $\alpha,\beta$-olefinically unsaturated carboxamide group in the manner of a Michael addition reaction proceeds at temperatures of less than 120° C.

The amount of amine used for the reaction should be at least such that the resin assumes cationic characteristics, ie. that in the coating bath it migrates under the influence of a voltage to the cathode when it has been made soluble by adding an acid.

The specific starting materials, quantities and reaction conditions are chosen in agreement with well-known experiences in such a way that gelling of the product is avoided during the reaction. For instance, excessively aggressive reaction conditions are not used. Similarly, nor are starting materials used which have reactive substituents which are capable of reacting with the epoxy compounds, since they can have an adverse effect on the reaction.

The coatings obtained with the use of the binders according to the invention can be hardened in the course of baking by polymerization reactions of the double bonds present in the binder molecule. However, additional crosslinking agents can advantageously be added to the electropaint, or it is possible to introduce into the binder molecule further reactive groups which effect a self-crosslinking reaction at elevated temperatures. These groups can advantageously be introduced by reacting some of the hydroxyl groups of the binder which have been formed by the opening of the epoxy rings with a partially blocked polyisocyanate which has on average one free isocyanate group per molecule and whose blocked isocyanate groups are stable at room temperature and become unblocked at elevated temperatures and react with the remaining hydroxyl groups to form a urethane.

Frequently used methods of crosslinking binders have been disclosed in, for example, the following patent publications: German Offenlegungsschrift No. 2,057,799, European Patent Application Nos. 12,463 and 4,090, and German Offenlegungsschrift No. 2,752,256.

If crosslinking agents are used, they as a rule constitute about 5 to about 60% by weight of the binder. They preferably amount to about 20 to about 40% by weight of the binder.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine and polymeric butylated melamine/formaldehyde resins.

Urea/aldehyde crosslinking agents can be prepared in a known manner by reacting urea and an aldehyde to the resol stage, and alkylating the reaction product with an alcohol under acidic conditions, which produces an alkylated urea/aldehyde resin. An example of a suitable crosslinking agent based on a urea/aldehyde resin is a butylated urea/formaldehyde resin.

It is also possible to use blocked polyisocyanates as crosslinking agents. For the purposes of the invention any desired polyisocyanate can be used where the isocyanate groups have been reacted with a compound, so that the blocked polyisocyanate formed is stable to hydroxyl groups at room temperature but reacts with them at elevated temperatures, as a rule within the range from about 90° to about 200° C. The blocked polyisocyanate can be prepared from any desired organic polyisocyanate which is suitable for crosslinking. Those isocyanates are preferred which contain about 3 to about 36, in particular about 8 to about 15, carbon atoms. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyanatophenyl)-methane, 4,4'-diisocyanatodiphenyl ether and 2,3-bis-(8-isocyanatooctyl)-4-octyl-5-hexylcyclohexane. It is also possible to use polyisocyanates of higher isocyanate functionality. Examples of such polyisocyanates are tris-(4-isocyanatophenyl)methane, 1,3,5-trisisocyanatobenzene, 2,4,6-triisocyanatotoluene, 1,3,5-tris-(6-isocyanatohexyl)biuret, bis-(2,5-diisocyanato-4-methylphenyl)methane and polymeric polyisocyanates, such as dimers and trimers of diisocyanatotoluene. Further, it is also possible to use mixtures of polyisocyanates.

Organic polyisocyanates which, for the purposes of the invention, are suitable for use as crosslinking agents can even be prepolymers which are derived, for example, from a polyol, including a polyether-polyol, or form a polyester-polyol. In this derivation reaction as is known polyols are reacted with an excess of polyisocyanates, thereby forming prepolymers having terminal isocyanate groups. Examples of polyols which can be used for this purpose are simple polyols, such as glycols, for example ethylene glycol and propylene glycol, or other polyols, such as glycerol, trimethylolpropane, hexanetriol and pentaerythritol; also monoethers, such as diethylene glycol and tripropylene glycol, and polyethers which are condensates of such polyols with alkylene oxides. Examples of alkylene oxides which are suitable for being condensed with these polyols to give polyethers are ethylene oxide, propylene oxide, butylene oxide and styrene oxide. These condensates are generally referred to as polyethers having terminal hydroxyl groups. They can be linear or branched. Examples of such polyethers are polyoxyethylene glycol having a molecular weight of 1,540, polyoxypropylene glycol having a molecular weight of 1,025, polyoxytetramethylene glycol, polyoxyhexamethylene glycol, polyoxynonamethylene glycol, polyoxydecamethylene glycol, polyoxydodecamethylene glycol and mixtures thereof. It is also possible to use other types of polyoxyalkylene glycol ether. Those polyether-polyols are particularly suitable which are obtained by reacting such polyols, namely, for example, ethylene glycol, diethylene glycol, triethylene glycol, 1,4-butanediol, 1,3-butanediol, 1,6-hexanediol and mixtures thereof, glyceroltrimethylolethane, trimethylolpropane, 1,2,6-hexanetriol, pentaerythritol, dipentaerythritol, tripentaerythritol, polypentaerythritol, methylglucosides and sucrose, with alkylenes, such as ethylene oxide, propylene oxide or mixtures thereof.

Any desired suitable aliphatic, cycloaliphatic or aromatic alkyl monoalcohol can be used for blocking the polyisocyanate. Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols, such as cyclopentanol and cyclohexanol, and aromatic alkyl alcohols, such as phenylcarbinol and methylphenylcarbinol. It is also possible, if desired, to use small amounts of high molecular weight and relatively involatile monoalcohols, which, after they have been split off, act as plasticizers in the coatings.

Other suitable blocking agents are hydroxylamines, such as ethanolamine, and oximes, such as ethyl methyl ketonoxime, acetonoxime and cyclohexanonoxime.

The blocked polyisocyanates are prepared by reacting such an amount of an alcohol with the organic polyisocyanate that there are no free isocyanate groups left over. The reaction between the organic polyisocyanate and the blocking agent is exothermic. This is why the polyisocyanate and the blocking agent are preferably mixed at a temperature which is not higher than 80° C., in particular which is less than 50° C., to counteract the exothermic effect.

The polyisocyanates and blocking agents mentioned can in suitable ratios also be used for preparing the partially blocked polyisocyanates described above.

The invention also relates to a process for preparing the binders, which comprises reacting (A) low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desird, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the general formula

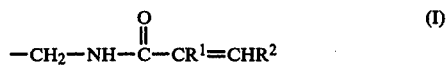

in which $R^1$ and $R^2$ are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

The process is carried out as follows: component A and component B are mixed and completely reacted with each other at temperatures between 100° and 140° C., preferably 115° to 135° C., if desired in the presence of catalysts, such as, for example, tertiary amines. The reaction can be monitored by means of the epoxide equivalent weight. This reaction product of components A and B can, if desired, be further modified with component C at temperatures between 100° and 140° C. This reaction also can be monitored by means of the epoxide equivalent weight. The resulting reaction product still contains free epoxy groups. This reaction step can be carried out using the same catalysts as in the reaction of components A and B. The resulting reaction product is reacted at temperatures between 90° and 120° C. with the modified monophenol or diphenol of component D. In the latter reaction step the amine is added to the double bonds, so that a binder is formed which contains basic amino groups. Alternatively, the amine can also be added to the double bonds of the modified phenol before the latter reacts with the epoxy groups.

The basic reaction product can be completely or partially protonated by adding acids, and then be dispersed in water. The crosslinking agent can be admixed to the binder before the dispersal in water, or, depending on the reactivity, can be added during the preparation of the binder. In the case of partially blocked polyisocyanates these are reacted with the binder at temperatures between 80° and 150° C., preferably at temperatures between 100° and 130° C. The electropaints obtained are stable, easily handled dispersions.

Where appropriate it can also be advantageous to dissolve the binders in suitable organic solvents before the dispersion is prepared. Examples of suitable solvents are glycol ethers, ethylglycol, butylglycol, ketones, such as diethylketone, methyl ethyl ketone, isobutyl methyl ketone, and the like.

The invention also relates to the use of the binders for electrocoating baths.

The electrocoating baths can contain customary pigments. A dispersant or a surface-active agent is frequently added to the pigments. The pigment and the surface-active agent used if desired are milled together with some of the binder or on their own, in order to prepare a paste which is diluted with the rest of the binder to prepare the coating composition.

In some cases it is advantageous to add to the electrocoating bath a nonionic modifier or solvent in order to improve the dispersibility, the viscosity and/or the quality of the film. Examples of such materials are aliphatic, naphthenic and aromatic hydrocarbons or mixtures thereof, monoalkyl and dialkyl ethers of glycols, Siberian pine needle oil and other solvents which are compatible with the resin system. The modifier preferred at present is 4-methoxy-4-methylpentan-2-one.

The electrocoating bath can also contain other additives, such as antioxidants. Examples thereof are ortho-amylphenol and cresol. The addition of such antioxidants is particularly desirable when the deposition baths are exposed to atmospheric oxygen for prolonged periods of stirring at elevated temperatures.

Other additives which the bath may contain are wetting agents, such as petroleumsulfonates, sulfated fatty amines or their amides, esters of sodium isothionates, alkylphenoxypolyethylene alcohols or phosphate esters, including ethoxylated alkylphenol phosphates. Other groups of possible additives are antifoams and suspending agents. Normal tap water can be used to make up the deposition bath. However, since such water contains relatively large amounts of salts, the electrical deposition process can thereby be modified in an undesirable manner. For this reason deionized water is generally preferred.

The possible additives listed above are not complete, since any other desired additive which does not interfere with the electrical deposition process can be used.

The invention also relates to a process for the electrophoretic coating of an electrically conductive substrate which is connected as the cathode, from an aqueous bath based on cationic binders which are at least partially neutralized with acids and which have been converted into being self-crosslinkable or the bath contains an additional crosslinking agent, which comprises the binders having been prepared by reacting (A) Low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the general formula

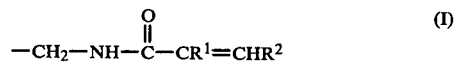

$$-CH_2-NH-\overset{\overset{\displaystyle O}{\|}}{C}-CR^1=CHR^2 \qquad (I)$$

in which $R^1$ and $R^2$ are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

The substrate on to which electrical deposition takes place can be any desired electrically conductive substrate. It is usually a metal substrate, such as, for example, iron, steel, copper, zinc, brass, tin, nickel, chromium or aluminum as well as other metals, pretreated metals and also phosphated or chromated metals. It is even possible to use impregnated paper or other conductive substrates.

In the cationic deposition process the articles to be coated are dipped into an aqueous dispersion of the solubilized film-forming cationic binder. An electric voltage is applied between the article to be coated, which serves as the cathode, and an anode, and the cationic binder is deposited on to the cathode by the electric current. The article is then removed from the bath and as a rule rinsed. The coating is then hardened in a customary manner by heating it.

In the examples which follow the invention is illustrated in more detail. All data concerning parts and percentages are by weight unless expressly stated otherwise.

EXAMPLE 1

(a) Preparation of a phenol substituted by an $\alpha,\beta$-olefinically unsaturated amidomethyl group (initial product 1)

94 parts of phenol and 202 parts of methylolacrylamide are dissolved at 50° C. in 456 parts of acetic acid, the solution is cooled down to 15° C., and HCl gas is passed in at this temperature until the solution is saturated. The temperature is then allowed to rise to 25° C., the mixture having to be slightly cooled. After 2 hours the mixture is diluted with 1,500 parts of methylene chloride and is then extracted 4 times with 1,500 parts of water each time. Thereafter a final extraction is carried out with a solution of 100 parts of sodium carbonate in 2,000 parts of water, and the organic phase is dried over sodium sulfate. The solvent is evaporated off in vacuo at 80° C., leaving behind a virtually colorless mass.

(b) Preparation of a crosslinking agent (initial product 2)

A reactor which is equipped with a heater, a cooler, a stirrer, a thermometer, an outlet line which leads to a washing apparatus and a facility for passing in nitrogen is charged with 12,280 parts of toluylene diisocyanate (mixture of about 80% of 2,4-toluylene diisocyanate and about 20% of 2,6-toluylene diisocyanate). Nitrogen is passed in, and the cooler is switched on. 5,550.5 parts of 2-ethylhexanol are gradually added in the course of 5 hours, during which the temperature slowly rises to 50° C. While a temperature of 50° C., is maintained, a further 3,649.5 parts of 2-ethylhexanol are added in the course of 4 hours. The reaction mixture is maintained at 50° C. for 75 minutes, the cooler is then switched off, and 3.6 pairs of dibutyltin dilaurate are added. The heater is switched on, and the reaction mixture is heated to 65.6° C. in the course of 45 minutes. 3,184 parts of 1,1,1-trimethylolpropane are added in the course of 2 hours and 50 minutes, during which the temperature rises to 120° C. The reaction mixture is maintained at this temperature for 90 minutes, when 10,560 parts of 2-ethoxyethanol are added. The resulting product is a solution of a polyurethane crosslinking agent.

(c) Preparation of a binder

A reactor which is equipped with a heater, a stirrer, a thermometer, a cooler and a nitrogen inlet tube is charged with 998 parts of a commercially available epoxy resin based on bisphenol A and having an epoxide equivalent weight of 188, 212 parts of 2-ethyl-2-tutylpropane-1,3-diol and 5.4 parts of dimethylbenzylamine. The temperature is raised to 132° C., and the reaction is carried out until an epoxide equivalent weight of 440 has been reached. 458 parts of an 80% strength solution in xylene of a commercially available polylactonepolyol having a molecular weight of 550 and 4.1 parts of dimethylbenzylamine are then added. The reaction temperature is maintained at 132° C. until an epoxide equivalent weight of 1,150 has been reached. 33% by weight, relative to the solids content, of the crosslinking agent described above (initial product 2) are then added. 1 part of 2,6-di-tert.-butyl-p-cresol and 345 parts of a modified phenol (initial product 1) and 5 parts of tributylphosphine are added. The temperature is maintained at 85° C. until epoxide groups are no longer detectable. 166 parts of hexylglycol are then added, and the mixture is cooled down to 60° C. 279 parts of diethanolamine are added. In the meantime, a dispersing bath of 1,919 parts of deionized water, 36 parts of glacial acetic acid and 62 parts of a commercially available emulsifier mixture is prepared. The resin solution is dispersed in this dispersing bath. After about 90 minutes a further 1,478 parts of deionized water are added and mixed in for 15 minutes.

(d) Preparation of a pigment paste (initial product 3)

A reactor which is equipped with a heater, a cooler, a stirrer and a nitrogen inlet tube is charged with 1,948 g of bisphenol A diglycidyl ether and 817 parts of 2,2-dimethyl-3-hydroxypropyl 2,2-dimethyl-1-3-hydroxypropionate. The batch is then heated and the temperature maintained at 132° C. until an epoxide equivalent weight of 1,350 has been reached. 675 g of a 90% strength solution in isobutyl methyl ketone of the half-blocked diisocyanate formed from 2-ethylhexanol and toluylene diisocyanate are then added. 3,109 g of butylglycol are then slowly added, and the mixture is cooled down to 80° C. In the meantime the following ammonium salt is prepared: the reaction product of 89.9 parts of diethanolamine and 330.9 parts of a half-blocked diisocyanate formed from 2-ethylhexanol and toluylene diisocyanate (95% strength in isobutyl methyl ketone) is neutralized with a mixture of 121.3 parts of 88% strength lactic acid and 95.7 parts of deionized water, in 40.4 parts of butylglycol. 884.1 g of this ammonium salt are added to the above batch. A further 220 g of butylglycol are then added, and the batch is maintained at 80° C. for 4 hours. The resin solution is then filtered. A clear solution is then prepared from 224 g of resin solution, 419 g of deionized water and 3.2 g of dibutyltin oxide. The solution is milled in a mill to a Hegman fineness of 7, and the mill base is then filtered.

The pigment paste is made up from the following components: 387 g of the resin solution are mixed with 631 g of deionized water, 387 g of aluminum silicate, 68 g of lead silicate and 54.2 g of carbon black. The mixture is incipiently milled on a Cowles mill for 15 minutes. 34 g of strontium chromate are then added. The material is then milled in a mill to a Hegman fineness of 7. 55.5 g of the clear solution described above are then admixed. The mixture is filtered and used as a black pigment paste.

(e) Preparation of a deposition bath, and preparation of a coating

The resin dispersion obtained according to (c) is combined with the pigment paste described (initial product 3) according to the following recipe: 2,100 parts of resin dispersion, 710 parts of pigment paste, 25 parts of acetic acid (10% strength) and 2,165 parts of deionized water.

The coating is deposited from the electrocoating bath thus prepared, in the course of 2 minutes on to a piece of sheet metal which is connected as the cathode, at a voltage of 260 V and at a bath temperature of 25° C. The coating is hardened at 185° C. in the course of 15 minutes. The baked film is 35 $\mu$m thick, and while being very smooth is distinguished by very good resilience.

EXAMPLE 2

A reactor which is equipped with a heater, a stirrer, a thermometer, a cooler and a nitrogen inlet tube is charged with 1,083 parts of a commercially available epoxy resin based on bisphenol A and having an epoxide equivalent weight of 188, 294 parts of neopentylglycol hydroxypivalate and 69 parts of xylene. 6 parts of dimethylbenzylamine are added as a catalyst. The temperature is raised to 135° C., and the reaction is carried out until an epoxide equivalent weight of 460 has been reached. 417 parts of a 95% strength solution in xylene of a commerically available polylactonepolyol having a molecular weight of 550 and 4 parts of dimethylbenzylamine are then added. The temperature is maintained at 135° C. until an epoxide equivalent weight of 1,210 has been reached. 1 part of 2,6-di-tert.-butyl-p-cresol and 374 parts of initial product 1, described in Example 1, and 5 parts of tributylphosphine are then added. The temperature is maintained at 85° C. until epoxide groups are no longer detectable. 129 parts of phenylglycol are added, the mixture is cooled down to 60° C., and 302 parts of diethanolamine are added. During this addition the temperature should not exceed 60° C. In the meantime a dispersing bath has been prepared from 2,359 parts of deionized water, 43 parts of glacial acetic acid and 24 parts of a commercially available emulsifier mixture. The above resin solution is dispersed in this dispersing bath. After 90 minutes a further 1,895 parts of deionized water are added and mixed in for 15 minutes.

The resin dispersion thus obtained is used to prepare a deposition bath in the manner of Example 1(e).

The coating is deposited in the course of 2 minutes at 290 V on to a piece of phosphated steel plate which is connected as the cathode. The temperature of the bath is 27° C. The deposited film is hardened at 180° C. in the course of 20 minutes. The baked film is 38 μm thick. The film shows evidence of very good leveling properties, and is highly resilient.

EXAMPLE 3

The binder synthesis of Example 2 is repeated, except that a reaction product I of 3 moles of polyglycol and 2 moles of hexamethylene diisocyanate is used in place of the commercially available polylactonepolyol. The conditions under which the binder is synthesized are exactly equal to the synthesis conditions of Example 2, but the weights of the reactants are as follows:
Epoxy resin: 973 parts
Neopentylglycol hydroxypivalate: 264 parts
Xylene: 62 parts
Dimethylbenzylamine: 6 parts
Reaction product I: 605 parts
Dimethylbenzylamine: 4 parts
Initial product 1: 336 parts
Phenylglycol: 131 parts
Diethanolamine: 272 parts
Deionized water: 2,124 parts
Glacial acetic acid: 77 parts
Emulsifier mixture: 49 parts
Deionized water: 2,099 parts
The epoxide equivalent weight before initial product 1 is added is 1,400.

Preparation of a deposition bath

The deposition bath is made up as in Example 1.

The coating is deposited at 320 V in the course of 2 minutes from the bath at 27° C. on to a piece of phosphated sheet metal which is connected as the cathode.

The baking process is carried out at 185° C. for 15 minutes. The resulting film is then 42 μm thick.

This bath formulation is distinguished by particularly great throwing power.

EXAMPLE 4

Initial product 4

500 parts of dihydroxydiphenyl sulfone and 606 parts of methylolacrylamide are dissolved at 50° C. in 456 parts of acetic acid, the solution is cooled down to 15° C., and HCl gas is passed in at this temperature until the solution is saturated. The mixture is then heated at 65° C. for 6 hours. The batch is then allowed to cool down to room temperature, when it is diluted with 2,000 parts of methylene chloride and extracted 4 times with 2,000 parts of water each time. To aid solubilization in the extraction with water water, for example, is added. The final extraction is carried out with a solution of 100 parts of sodium carbonate in 2,000 parts of water, and the organic phase is dried over sodium sulfate. The solvent is removed at 80° C. in vacuo.

Preparation of the binder

The reactor is charged with 744 parts of a commercially available epoxy resin based on bisphenol A (epoxide equivalent weight 188), 149 parts of thiodipropylene glycol, 54 parts of xylene and 6 parts of dimethylbenzylamine. The temperature is raised to 135° C. and maintained there until an epoxide equivalent weight of 420 has been reached. 423 parts of a polyester formed from neopentylglycol and adipic acid (OH number 131) and 4 parts of dimethylbenzylamine are then added. The temperature is again raised to 135° and maintained there until an epoxide equivalent weight of 1,280 has been reached. 1.5 parts of 2,6-di-tert.-butyl-p-cresol and 494 parts of initial product 4 are then added at 135° C., and the reaction is carried out until epoxy groups are no longer detectable. The mixture is then cooled down to 110° C., and 470 parts of the crosslinking agent solution described in Example 1 and 136 parts of propylene glycol monophenyl ether are added. The mixture is mixed for 15 minutes and then cooled down to 70° C. 312 parts of diethanolamine are then added. During this addition the temperature should be maintained at 70° C.

In the meantime a dispersing bath has been prepared from 2,193 parts of deionized water, 37 parts of a commercially available emulsifier mixture and 89 parts of glacial acetic acid. The resin solution is dispersed in this dispersing bath. After 90 minutes a further 1,896 parts of deionized water are added and mixed in for 15 minutes. The dispersion then has a solids content of 37.5%.

Preparation of the deposition bath

A deposition bath is made up as in Example 1.

The coating is deposited at a bath temperature of 27° C. and at 280 V in the course of 2 minutes on to a piece of phosphated sheet metal which is connected as the cathode. The deposited film is baked at 185° C. for 15 minutes. The resulting film is 37 μm thick. The film has spread out smooth, and adheres firmly to the substrate.

EXAMPLE 5

A reaction vessel is charged with 923 parts of a commercially available epoxy resin based on bisphenol A (epoxide equivalent weight 188), 162 parts of dimethylmalonic acid, 71 parts of xylene and 6 parts of dimethylbenzylamine. The temperature is raised to 145° C. and the reaction is carried out until an epoxide equivalent weight of 420 has been reached. The batch is cooled down to 130° C., and 332 parts of a commercially available polycaprolactonepolyol (OH number 210) and 4 parts of dimethylbenzylamine are added. The reaction batch is maintained at 130° C. until an epoxide equivalent weight of 1,100 has been reached. 2 parts of 2,6-di-tert.-butyl-p-cresol and 613 parts of initial product 4, described above, are added, the temperature is again raised to 145° C., and the reaction is continued until epoxy groups are no longer detectable. 163 parts of a commercially available mixture of various diisobutyl esters are then added, the batch is cooled down to 60° C., and 193 parts of diethanolamine and 138 parts of methylethanolamine are added. When the amine addition reaction has ended 3 parts of a commercially available Cr-containing catalyst and 88 parts of butylene oxide are added. The reaction is carried out at 80° C. until epoxy groups are no longer detectable. In the meantime a dispersing bath has been prepared from 2,051 parts of deionized water, 49 parts of a commercially available emulsifier mixture and 73 parts of glacial acetic acid. The resin solution is dispersed in this dispersing bath. After 90 minutes a further 2,100 parts of deionized water are added and mixed in for 15 minutes. The dispersion then has a solids content of 35%.

Preparation of a deposition bath

A deposition bath is made up in accordance with the recipe in Example 1.

The paint is deposited at a bath temperature of 27° C. and at 290 V in the course of 2 minutes on to a piece of phosphated sheet metal which is connected as the cathode. The deposited film is baked at 185° C. in the course of 20 minutes. The film is 41 μm thick.

EXAMPLE 6

Example 1(a) is repeated. When the methylene chloride has been removed in vacuo, 210 parts of diethanolamine and 100 parts of phenylglycol are added, and the mixture is maintained at 90° C. for 2 hours. A reaction product having an epoxide equivalent weight of 1,210 is then prepared in the manner described in Example 2 from 1,083 parts of epoxy resin based on bisphenol A, 294 parts of neopentylglycol hydroxypivalate and 417 parts of polylactonepolyol.

819 parts of the addition product described above, namely of diethanolamine and acrylamidomethylated phenol, are then added and the temperature is maintained at 85° C. until epoxy groups are no longer detectable. In the meantime a dispersing bath has been prepared from 2,359 parts of deionized water, 43 parts of glacial acetic acid and 24 parts of a commercially available emulsifier mixture. The above resin solution is dispersed in this dispersing bath. After 90 minutes a further 1,895 parts of deionized water are added and mixed in for 15 minutes.

A deposition bath is prepared with the resin solution obtained, in the manner of Example 2, and the deposition is carried out. The baked film is 42 μm thick and shows evidence of very good leveling properties.

We claim:

1. A water-dispersible binder which is intended for cationic electropaints and is based on reaction products which are formed from modified epoxy resins with primary and/or secondary amines and which can, if desired, also contain crosslinking agents, pigments, flow-control agents and other customary auxiliaries, which contains as reaction products those which have been prepared by reacting (A) Low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the formula

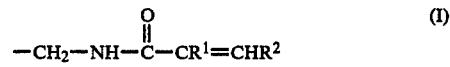

in which R¹ and R² are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

2. A binder as claimed in claim 1, in which an epoxy resin based on bisphenol A has been used as component A.

3. A binder as claimed in claim 1, in which a polyglycidyl ester has been used as component A.

4. A binder as claimed in claim 3, in which a diol or a dicarboxylic acid having a branched aliphatic chain has been used as component B.

5. A binder as claimed in claim 4, in which a diol or a dicarboxylic acid having at least one neo sturcture has been used as component B.

6. A binder as claimed in claim 5, in which component C had a molecular weight between 530 and 3,000.

7. A binder as claimed in claim 6, in which a linear polyester has been used as component C.

8. A binder as claimed in claim 6, in which a linear polyether has been used as component C.

9. A binder as claim 6, in which a linear polyurethane, a linear polyamide or a linear dicarboxylic acid has been used as component C.

10. A binder as claimed in claim 6, in which a polythioether has been used as component C.

11. A binder as claimed in claim 6, in which the component C content is 10–50% by weight, relative to the total binder.

12. A binder as claimed in claim 11, in which some of its hydroxyl groups have been reacted with a partially blocked polyisocyanate.

13. A process for preparing a water-dispersible binder which is intended for cationic electropaints and is based on reaction products which are formed from modified epoxy resins and primary and/or secondary amines, which comprises reacting (A) low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the formula $$-CH_2-NH-\overset{O}{\underset{\|}{C}}-CR^1=CHR^2 \qquad (I)$$

in which $R^1$ and $R^2$ are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

14. The process as claimed in claim 13, wherein an epoxy resin based on bisphenol A is used as component A.

15. The process as claimed in claim 13, wherein a polyglycidyl ester is used as component A.

16. The process as claimed in claim 13, wherein a diol or a dicarboxylic acid having a branched aliphatic chain is used as component B.

17. The process as claimed in claim 16, wherein a diol or a dicarboxylic acid having at least one neo structure is used as component B.

18. The process as claimed in claim 17, wherein component C has a molecular weight between 530 and 3,000.

19. The process as claimed in claim 18, wherein a linear polyester is used as component C.

20. The process as claimed in claim 18, wherein a linear polyether is used as component C.

21. The process as claimed in claim 18, wherein a linear polyurethane, a linear polyamide or a linear dicarboxylic acid is used as component C.

22. The process as claimed in claim 18, wherein a polythioether is used as component C.

23. The process as claimed in claim 27, wherein the component C content is 10 to 50% by weight, relative to the total binder.

24. The process as claimed in claim 23, wherein some of the hydroxyl groups of the binder are reacted with a partially blocked polyisocyanate.

25. A process for the electrophoretic coating of an electrically conductive substrate which is connected as the cathode, from an aqueous bath based on cationic heat-curable binders at least partially neutralized with acids, wherein the binders have been prepared by reacting (A) low molecular weight epoxy resins which contain aromatic groups and have an epoxide equivalent weight of less than 375 with (B) aliphatic and/or alicyclic polyfunctional alcohols or carboxylic acids having a molecular weight of less than 350 by addition to the epoxy group in such a way that the reaction products contain 10–45% of aromatic groups, calculated as phenylene group, and reacting the reaction products of A and B with (C) if desired up to 60% by weight, relative to total binder, of polyfunctional alcohols, carboxylic acids and/or SH compounds having a molecular weight of 300–5,000, the molar ratios of (A), (B) and, if desired, (C) being chosen in such a way that the resulting intermediate product has terminal epoxy groups, (D) by reacting the intermediate product by the addition of a phenolic hydroxyl group of a monophenol and/or diphenol to the epoxy groups, the monophenol or diphenol having as a substituent on the aromatic ring(s) at least one grouping of the formula $$-CH_2-NH-\overset{O}{\underset{\|}{C}}-CR^1=CHR^2 \qquad (I)$$

in which $R^1$ and $R^2$ are identical to or different from one another and represent hydrogen or a methyl group, with the proviso that primary and/or secondary amines have been added, before or after the reaction of the phenolic hydroxyl groups with the epoxy groups, to at least some of the groupings of the formula (I).

26. The process as claimed in claim 25, wherein an epoxy resin based on bisphenol A has been used as component A.

27. The process as claimed in claim 25, wherein a polyglycidyl ester has been used as component A.

28. The process as claimed in claim 25, wherein a diol or a dicarboxylic acid having a branched aliphatic chain has been used as component B.

29. The process as claimed in claim 28, wherein a diol or a dicarboxylic acid having at least one neo structure has been used as component B.

30. The process as claimed in claim 29, wherein component C has a molecular weight between 530 and 3,000.

31. The process as claimed in claim 30, wherein a linear polyester has been used as component C.

32. The process as claimed in claim 30, wherein a linear polyether has been used as component C.

33. The process as claimed in claim 30, wherein a linear polyurethane, a linear polyamide or a linear dicarboxylic acid has been used as component C.

34. The process as claimed in claim 30, wherein a polythioether has been used as component C.

35. The process as claimed in claim 34, wherein the component C content is 10 to 50% by weight, relative to the total binder.

36. The process as claimed in claim 35, wherein some of the hydroxyl groups of the binder have been reacted with a partially blocked polyisocyanate.

* * * * *